Dec. 17, 1957     J. R. OISHEI     2,816,316
WINDSHIELD CLEARING SYSTEM

Filed May 28, 1953     3 Sheets-Sheet 1

INVENTOR.
John R. Oishei,
by Beau, Brooks, Buckley & Beau,
ATTORNEYS.

Dec. 17, 1957   J. R. OISHEI   2,816,316
WINDSHIELD CLEARING SYSTEM
Filed May 28, 1953   3 Sheets-Sheet 2

INVENTOR.
John R. Oishei,
by: Bean, Brooks, Buckley & Bean,
ATTORNEYS.

Dec. 17, 1957 — J. R. OISHEI — 2,816,316
WINDSHIELD CLEARING SYSTEM
Filed May 28, 1953 — 3 Sheets-Sheet 3
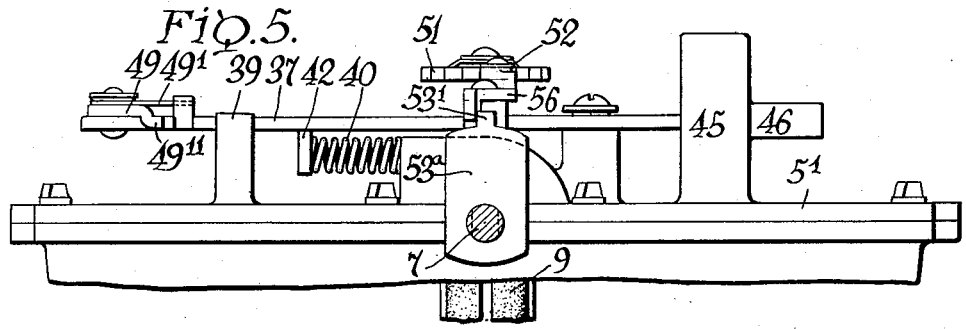
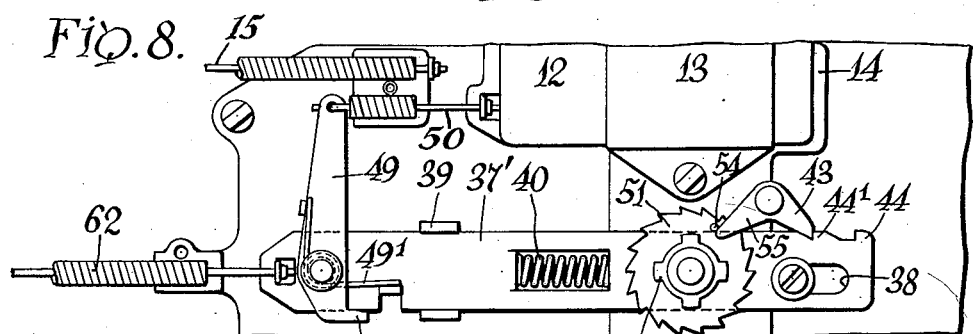
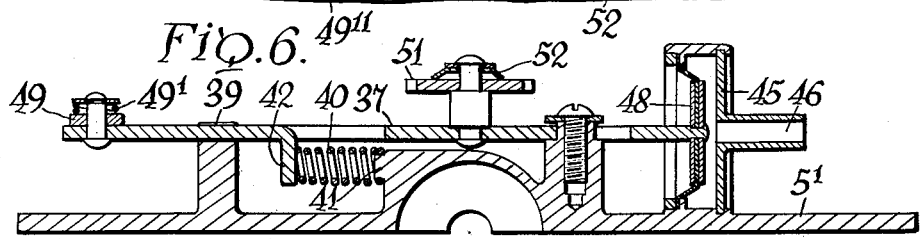
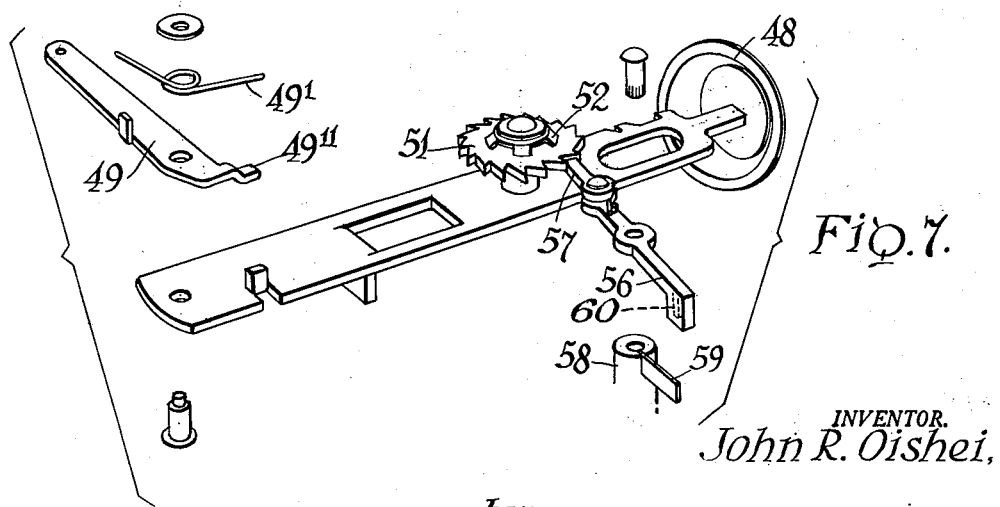
INVENTOR.
John R. Oishei,
by: Bean, Brooks, Buckley & Bean,
ATTORNEYS.

United States Patent Office 2,816,316
Patented Dec. 17, 1957

2,816,316

WINDSHIELD CLEARING SYSTEM

John R. Oishei, Buffalo, N. Y., assignor to Trico Products Corporation, Buffalo, N. Y.

Application May 28, 1953, Serial No. 358,021

21 Claims. (Cl. 15—250.4)

This invention relates to a windshield cleaning system and more particularly to a mechanism to coordinate the action of a windshield washer with the action of a windshield wiper for the joint operation of both followed by a continuation of the wiper operation alone to insure a clean field of vision through the shield.

In one of my earlier copending applications, hereinafter referred to, it has been proposed to coordinate the wiper and washer units of a windshield cleaning system in a manner to prolong the wiping action beyond the washing process. However, in such system the prolongation was carried on without regard to the stroking of the wiper and therefore it would be possible to have a lack of uniformity in the results accomplished.

The prime object of the present invention is to provide a means of timing the operation of the windshield cleaner in accordance with the number of wiping strokes to provide definite uniformity in the cleaning of the windshield. Further, the invention comprehends the joint action of the wiper and washer units for a prescribed period, pre-set by an arrangement of gearing whereby the windshield wiper will continue its action after the delivery of the water or other liquid solvent has been terminated to insure the wiping of the windshield glass to a clean dry condition.

A further object of the invention is to provide a means of automatically releasing the timing mechanism and to simultaneously cause the windshield wiper control valve to be moved into its parked or off position.

Another object of the invention is to provide a means of moving the control of the windshield wiper, when the control is in a partially open position for normal wiper speed, to a full open position and to subsequently return the wiper control back to the preset point of normal operation, whereby the wiper speed of cycling may resume the same rate of movement in effect before the operation of the washer. In other words, the wiper will be momentarily accelerated for joint action with the washer and thereafter restored to its previously set speed of wiper operation alone.

For these purposes the coordinating mechanism constitutes an auxiliary motor which is operable with the washer unit to bring the wiper unit into concurrent operation and at the same time to position an otherwise inoperative timing arrangement with respect to a moving part of the wiper unit to count or impress the wiping strokes upon the timing arrangement and thereby make the latter dependent upon the actual strokes of the wiper on the windshield glass. When the windshield cleaner alone is operating the coordinator is displaced to an inoperative position so that the wiper strokes will not be impressed thereon.

The foregoing and other objects will manifest themselves as the foregoing description progresses, reference being had therein to the accompanying drawings, wherein Fig. 1 is a diagrammatic view illustrating a combined windshield cleaner and washer as installed on a motor vehicle;

Fig. 5 is a fragmentary side elevation of the cleaner and timing mechanism shown in Fig. 2;

Fig. 6 is a longitudinal sectional view through the timing mechanism as mounted on the cover of the windshield cleaner motor;

Fig. 7 is an exploded perspective view of the timing mechanism;

Fig. 8 is a modified form of the timing mechanism applied to a pedal-controlled windshield washing system; and Fig. 9 is a detail view of the controlling pedal.

Figure 1:
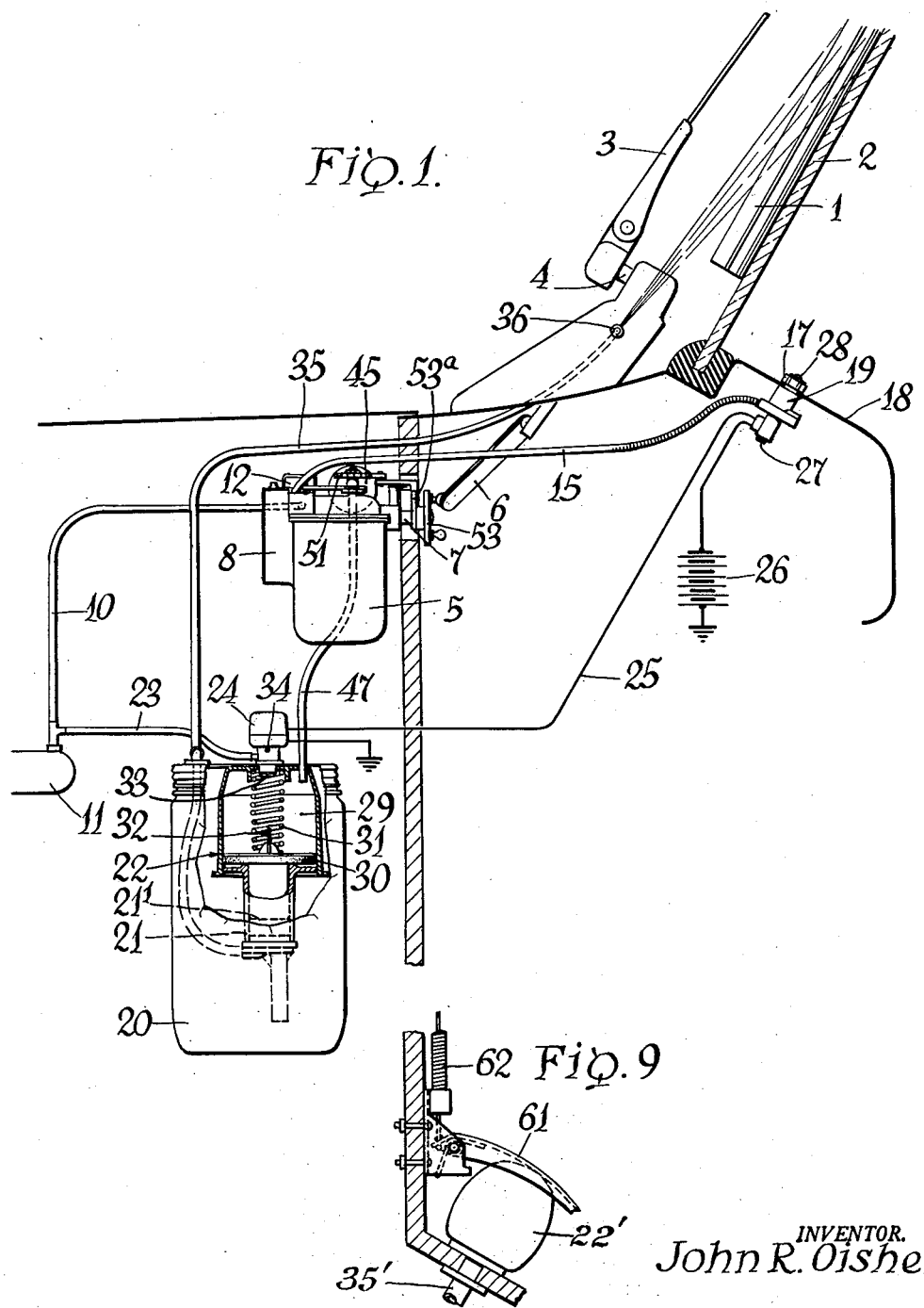

Referring more particularly to the drawings, the windshield cleaner unit comprises a wiper or blade 1 which is oscillated over the surface of the windshield 2 by the usual spring pressed wiper arm 3 that in turn is fixed to an oscillatory shaft 4 journaled at the lower side of the windshield. The shaft 4 is suitably driven, as by either a pneumatic or an electric motor 5, through a connecting transmission 6 which operatively connects the motor shaft 7 to the oscillatory shaft. The motor illustrated is of the pneumatic type and embodies the usual automatic valve mechanism within a chamber 8 for operatively reversing the pressure differential on the piston or vane 9 in turn fixed to the motor shaft 7, the motor being connected by conduit 10 to the intake manifold 11 as a source of suction. The communication with this source of subatmospheric pressure is established or shut off by a manual control in the form of a valve 12 that is slidably confined by a strap or guide 13 to its ported valve seat 14. This control valve is made accessible by a Bowden wire 15 that leads up through a rack and pinion connector 19 to a rotatable knob 17 on the instrument panel 18. When it is desired to use the cleaner, the knob 17 will be turned to open the valve 12 to its running position.

Associated with the windshield cleaner is a washer unit designed for wetting the windshield surface to facilitate the wiping of the same clean of foreign matter. This unit embodies a reservoir 20, a pump 21, either a pneumatic or an electric motor 22, and a manual control in the form of a switch 27. In Fig. 1, the motor is of the pneumatic type and is connected to the source of vacuum 11 by a conduit 23 and an electromagnetic valve 24. The electromagnet is included in a circuit 25 with the battery 26, as a source of electric energy, and with said control switch 27, the latter having a push button 28 projecting through the knob 17 for convenience. By closing the switch 27 the valve 24 will open the source of suction to the motor chamber 29 of the washer unit to provide a pressure differential on the motor piston 30 for lifting it against the action of its return spring 31 and concurrently for lifting the connected pump plunger 21' to intake a charge of the liquid solvent from the reservoir. As the piston approaches its uppermost position a small spring 32 carried thereby will close the valve 33 to interrupt the suction communication to open the motor chamber to the atmosphere through a port 34. This frees the power spring 31 to function in pumping the liquid solvent through a hose 35 and a nozzle 36 by means of which it is sprayed onto the windshield.

The foregoing construction is described with greater detail in my Patent No. 2,743,473, wherein the windshield cleaner control and the windshield washer control are coordinated to bring the windshield cleaner into operation whenever the washer is used at which time the windshield cleaner will operate throughout the application of the liquid solvent and for a predetermined time interval thereafter to wipe the windshield surface dry of the solvent. In such earlier application the time-delay was obtained specifically through a metered control of fluid flow into a chamber to retard the action of a spring employed for turning off the windshield cleaner, an action that was performed independently of the operation of either the washer unit or the cleaner unit, and therefore an action which may be accomplished either prematurely or after an unduly prolonged lapse of time, depending upon the accuracy in regulating and maintaining the bleeding flow.

In accordance with the present invention, the time-lag or time-delay in terminating the wiper operation after the operation of the washer unit is dependent upon the windshield cleaner unit and determined by its operation in providing a definite number of wiper strokes to wipe the windshield of film and globules of the liquid solvent which otherwise might tend to obscure the vision therethrough. In other words, the timing mechanism is responsive to the stroking of the windshield cleaner and the washer is designed to deliver a spray for a predetermined time interval short of the period of cleaner operation and therefore it is possible to determine the number of strokes of the oscillating wiper following the termination of the definite spray interval.

Figure 2:
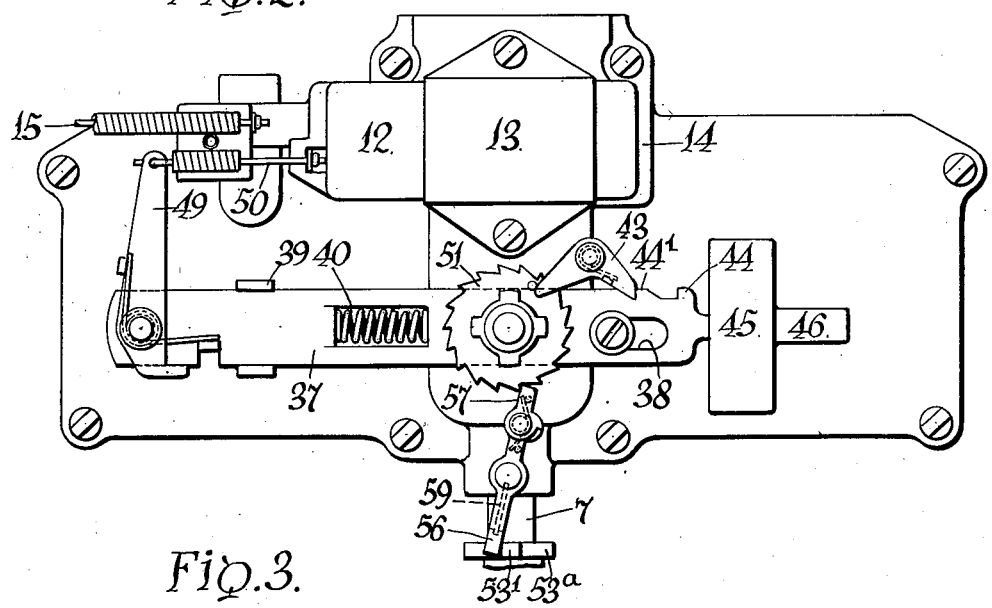
Fig. 2 is a top plan view of the windshield cleaner motor showing a timing mechanism mounted thereon and operating just prior to shutting off the cleaner mechanism.
Figure 3:
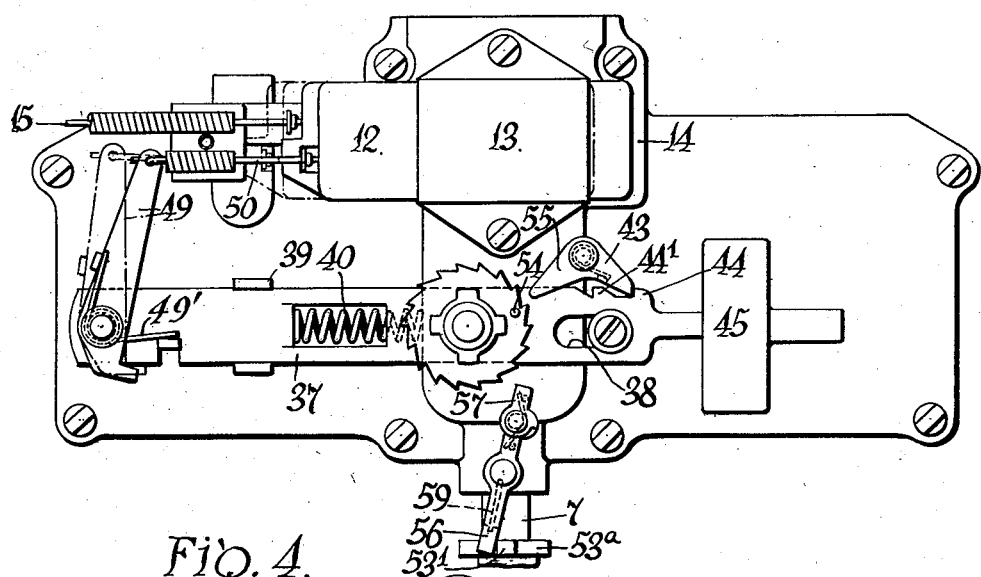
Fig. 3 is a similar view showing the parts in their inoperative position.
Figure 4:
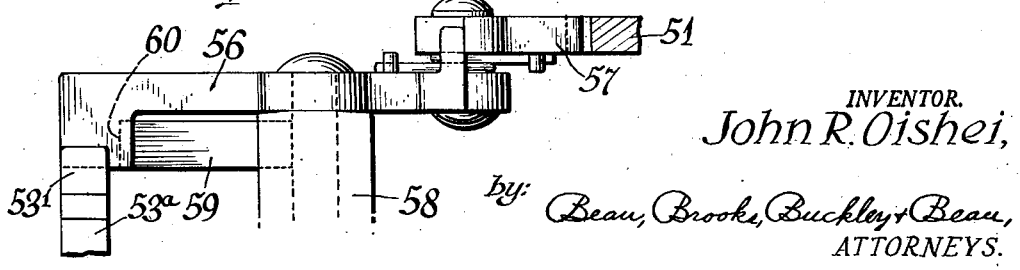
Fig. 4 is a fragmentary detail view of the pawl and ratchet of the timing mechanism.

To this end there is shown in the preferred embodiment an elongated carriage 37 that is slidably mounted on the cover 5' and guided by a pin and slot connection 38 at one end and a pair of upstanding lugs 39 at the opposite end. A coil spring 40 is positioned between a shoulder 41 on the motor cover 5' and a shoulder 42 on the carriage to urge the latter normally to its inoperative position where it is held by a spring pressed dog or catch 43 engaging a tooth 44 on the carriage. An auxiliary suction motor 45 has communication through a nipple 46 and a conduit 47 with the chamber 29 of the washer motor so that when the washer is in operation and suction of a predetermined value is maintained within the chamber the piston 30 will be lifted to energize the pump. At the same time the suction in the chamber 29 will evacuate the chamber of the auxiliary motor 45 to create a pressure differential on its diaphragm 48 for moving the carriage to its operative position where it is held by the catch engaging a second tooth 44', as shown in Fig. 2. During this movement of the carriage, an arm 49 thereon will act through a connecting link 50 to open the control valve 12 for setting the windshield cleaner in operation. The motor 45 therefore functions to coordinate the action of the windshield cleaner with that of the washer unit for joint operation whenever the washer is used. This coordination maintains throughout the washer cycle as determined by the spring 31 which spends itself to automatically terminate the liquid spray following a predetermined time interval.

After the wetting operation, the wiper continues to function for several strokes to wipe the windshield practically dry and then the wiper is parked at one side of the field of vision. The timing mechanism is constructed to give a predetermined number of wiper strokes which are counted off by the timing mechanism to provide a definite post-washer operation of the wiper sufficient to wipe the glass free of vision-blurring droplets and film. This timing mechanism embodies a timing gear in the form of a ratchet 51 which is rotatably mounted on the carriage 37 and is provided with a friction brake in the form of a spring washer 52 to hold it stationary between its increments of movement as it is moved intermittently by a reciprocatory part of the windshield cleaner, such as the double crank arm or driver 53 which is fixed to the motor shaft 7. The action is such that on each subsequent stroke of the reciprocatory part 53 in a given direction the ratchet or timing gear 51 will be engaged indirectly by a lug 53' and advanced one tooth at a time. A catch-tripping pin 54 on the timing gear moves in a circular path into which extends a finger 55 of the spring-loaded catch 43 so that when the gear is about to complete one revolution it will wipe against the finger and depress it thereby to lift the catch from its tooth 44' and permit the spring 40 to restore the carriage to its normal position and through the arm 49 to shift the control valve 12 to its wiper parking position. The catch will then engage the tooth 44 to hold the carriage fixed. The reciprocating lug 53' may act through an intermediate pawl 56 having a spring-loaded nose piece 57 to engage the timing gear positively in one direction of movement and to yieldably and idly wipe thereover in the return direction. This pawl 56 is pivotally mounted on a post 58 in which is anchored a spring leaf 59 to engage in a recess 60 in the pawl to yieldably hold it in a normal position from which the lug 53' will wipe over it and beyond in both directions of its oscillation. If desired the lug 53' may be carried by an inset part 53a of the driver 53, as shown in Fig. 1.

In normal windshield cleaner operation per se, the lug 53' will idly wipe the pawl in both directions since the ratchet is normally displaced from the path of the pawl by the spring 40. By merely turning the knob 17, the flexible connector 15, which is unconnected to the valve 12, will slide against it and move it to its open position. The arm 49, being permanently connected to the valve, will yield for this purpose and for this reason it is pivoted on the carriage and held by a spring 49'. A stop 49" engages the carriage to provide for positive action when the coordinator is employed to open valve 12.

When the washer is brought into operation the carriage is shifted to operatively place the ratchet with respect to the pawl to be actuated thereby. This movement also acts through the arm 49 and link 50 to open valve 12. During the functioning of the coordinator, the washer and the cleaner operate simultaneously, and following this joint action the wiper will complete a predetermined number of wiper strokes before it is finally parked. The timing gear or ratchet is shown as having eighteen teeth which requires the wiper to complete eighteen full wiping cycles of thirty-six individual strokes before parking again. Since the washer unit delivers its charge of liquid solvent within a given period as predetermined by its power spring 31, which delivery is effected during the initial stroking of the wiper, there will follow a definite number of wiper strokes in the post-washer interval of the windshield cleaner operation. For example, if the washer completes its wetting operation at the end of the eighth cycle of the wiper then the latter will continue its operation independently for the remaining ten cycles to dry the glass surface. The timing gear is replaceable by one of more or less teeth to vary the length of this post-washer operation.

The washer unit is herein depicted as being pneumatically operable but it may be electrically operated as, for example, by utilizing the unit shown in Patent 2,649,332; likewise the auxiliary motor 45 for shifting the carriage to its operative position may be replaced by an electromagnetic motor; and as above stated the cleaner motor may be of the electric type, all for the purpose of making an all-electric installation to oscillate the driver 53 and to shift a control switch through the arm 49.

In lieu of the push button 28 on the instrument panel a pedal 61 may be employed to act through the Bowden wire 62 to shift the valve to its operative position. This flexible wire connector 62 extends up to the modified carriage 37' of Fig. 8, which omits the auxiliary motor. The pedal serves to compress a bulb 22' which is connected by a conduit 35' to the washer reservoir. Depression of the pedal will primarily eject a spray of the liquid solvent from the nozzle and secondarily to shift the carriage and the arm 49 to open the valve 12 where it is held open by the catch 43 for the ratchet-prescribed time period.

The duration of the washer-initiated wiper action is dependent solely upon the windshield cleaner, upon a moving part of its mechanism, and in harmony with the wiping strokes, with the result that the measured time interval is definitely related to the number of strokes whether the wiper is operating rapidly or slowly. The cleaner system is efficient and requires but a simple act, the depression of the push button 28, to start the chain of actions recited, and while the foregoing description has been given for clarity it has been made without thought of limitation since the inventive concepts are capable of assuming other physical embodiments without departing from the spirit of the invention and the scope of the appended claims.

What is claimed is:

1. In a windshield cleaning system, a wiper, a powered motor for said wiper, a control for said motor, fluid delivery means including a pump element, means operably connecting said control to said pump element and arranged to connect said motor to a source of power to initiate operation of said motor automatically upon initiating operation of said pump element, and means operated by said motor to provide a prearranged functional duration of motor operation to continue the movement of said wiper after the delivery of fluid is terminated, said last-named means including time controlled means responsive to such prearranged duration of motor operation to park said wiper.

2. A windshield cleaning system comprising a cleaner unit having a wiper and a part moving back and forth for oscillating said wiper, a control for the unit, a washer unit operable to deliver a liquid solvent to the windshield surface for a predetermined time interval and cleaner arresting means embodying a time delay mechanism operatively associated with the washer unit and automatically responsive to a predetermined number of wiper strokes.

3. A windshield cleaning system comprising a cleaner unit having a wiper and a part moving back and forth for oscillating said wiper, a washer unit operable to deliver a liquid solvent to the windshield surface for a predetermined time interval, a control for each unit, coordinating means for the operation of the washer unit and for actuating the cleaner unit control to start the cleaner unit in operation, and a normally inoperative timing arrangement operatively associated with the washer unit to count off a predetermined number of wiper strokes preliminary to restoring the cleaner control to its arresting position.

4. A windshield cleaning system comprising a cleaner unit having a wiper and a part moving back and forth for oscillating the wiper, a washer unit operable to deliver a liquid solvent to the windshield surface for a predetermined time interval, a control for each unit, a coordinating motor connected to the control for the cleaner unit and responsive to the operating power supplied the washer unit to move the cleaner control to its operating position, a normalizing spring for said coordinating motor for reverse motion when operating power is withdrawn and timing means operable by the movement of said part to release the coordinating motor for reverse action to restore the cleaner control to its arresting position.

5. A windshield cleaning system having a cleaner motor and a wiper reciprocated thereby, a washer unit having a motor operable for a predetermined time interval to deliver a liquid solvent onto an associated windshield surface for being spread by the wiper, and a coordinator responsive to the operation of the washer unit for operating the cleaner motor concurrently and including a timing device that is dependent upon a plurality of strokes of the reciprocating wiper to release the coordinator after a predetermined number of wiper strokes and thereby to effect stoppage of wiper operation.

6. A windshield cleaning system having a cleaner motor and a wiper reciprocated thereby, a washer unit having a motor operable for a predetermined time interval to deliver a liquid solvent onto an associated windshield surface for being spread by the wiper, a coordinating carriage operable with the operation of the washer unit to start the cleaner motor in operation, holding means acting to secure the carriage in its operative position and a timing device carried by the carriage and having a normally inoperative release member operable by a predetermined number of wiper strokes to render inoperative the holding means and thereby release the carriage for arresting the cleaner motor.

7. A windshield cleaning system comprising a windshield cleaner unit having a reciprocating wiper-actuating part, a windshield washer unit operable to deliver liquid solvent into the path of the wiper on an associated windshield surface, a coordinator having a carriage movable by and upon operation of the washer unit to an operative position to start the cleaner unit in operation, and a timing device mounted on the carriage and operable by a predetermined number of strokes of said reciprocating part to release the carriage from its wiper operating position.

8. A windshield cleaning system comprising a windshield cleaner unit having a reciprocating wiper-actuating part, a windshield washer unit operable to deliver liquid solvent into the path of the wiper, a normally inoperative coordinator having a carriage movable to an operative position by and upon operation of the washer unit to start the cleaner unit in operation, and a timing device positioned by the carriage to be actuated by said reciprocating part for releasing the carriage from its wiper operating position after a predetermined number of strokes.

9. A windshield cleaning system comprising a windshield cleaner unit having a reciprocating wiper actuating part, a windshield washer unit operable to deliver liquid solvent into the path of the wiper, a normally inoperative coordinator having a carriage movable by and upon operation of the washer unit to start the cleaner unit in operation, a timing device positioned by the carriage to be operated intermittently by said reciprocating part and responsive to a predetermined cumulative effect thereof to release the carriage from its wiper operating position, and restoring means acting to move the carriage to its inoperative position when released.

10. A windshield cleaning system comprising a windshield cleaner unit having a reciprocating wiper, a windshield washer unit operable to deliver liquid solvent into the path of the wiper, a normally inoperative coordinator having a carriage movable by and upon operation of the washer unit to start the cleaner unit in operation, a timing device positioned by the carriage to be operated intermittently by said reciprocating part and responsive to a predetermined cumulative effort thereof to release the carriage from its wiper operating position, and restoring means acting to move the carriage to its inoperative position when released.

11. A windshield cleaning system comprising a windshield cleaner unit having a reciprocating wiper, a windshield washer unit operable to deliver liquid solvent to the wiper for a definite time interval, a coordinator operable with the washer unit and embodying a carriage movable to start the cleaner unit in operation, and a wiper controlled timing device responsive to a predetermined number of wiper strokes to release the carriage from its wiper operating position.

12. A windshield cleaning system comprising a windshield cleaner unit having a reciprocating wiper, a windshield washer unit operable to deliver liquid solvent to the wiper for a definite time interval, a coordinator operable with the washer unit, a control for the cleaner unit connected to the coordinator to be actuated thereby for starting the wiper, manual means for operating the control independently of the coordinator, and a wiper arresting device responsive to the cumulative effort of a predetermined number of wiper strokes to render the coordinator inoperative for arresting the wiper.

13. A windshield cleaning system comprising a windshield cleaner unit having a wiper and an actuating part reciprocating in a path of movement, a windshield washer unit operable to deliver a charge of liquid solvent for being spread by the wiper, a coordinator carriage movable from a normal position to a cleaner operating position by and upon operation of the washer unit to utilize the cleaner unit jointly therewith and a normally inoperative stroke-counting device positionable by the carriage into the path of said actuating part and operable by a predetermined number of strokes thereof to release the carriage from its cleaner operating position.

14. A windshield cleaning system comprising a windshield cleaner unit having a wiper and an actuating part reciprocating in a path of movement, a windshield washer unit operable to deliver a charge of liquid solvent for being spread by the wiper, a coordinator carriage movable from a normal position to a cleaner operating position by and upon operation of the washer unit to utilize the cleaner unit jointly therewith, and a normally inoperative stroke-counting device positionable by the carriage into the path of said actuating part and operable by a predetermined number of strokes thereof to release the carriage from its cleaner operating position, holding means engageable with the carriage to hold it in such cleaner operating position, said stroke-counting device embodying a member movable by the carriage into such path for intermittent engagement by said actuating part to effect step by step advancement of said member, the latter having a release part operable upon a predetermined advancement for rendering said holding means inoperative to permit the carriage to return to its normal position for arresting the cleaner unit and for displacing said member from such path.

15. A windshield cleaning system comprising a windshield cleaner unit having a wiper and an actuating part reciprocating in a path of movement, a windshield washer unit operable to deliver a charge of liquid solvent for being spread by the wiper, a coordinator carriage movable from a normal position to a cleaner operating position by and upon operation of the washer unit to utilize the cleaner unit jointly therewith, and a normally inoperative stroke-counting device positionable by the carriage into the path of said actuating part and operable by a predetermined number of strokes thereof to release the carriage from its cleaner operating position, holding means engageable with the carriage to hold it in such cleaner operating position, said stroke-counting device embodying a member movable by the carriage into such path for intermittent engagement by said actuating part to effect step by step advancement of said member, the latter having a release part operable upon a predetermined advancement for rendering said holding means inoperative, and means for returning the carriage to its normal position to arrest the cleaner unit and to displace the member from such path.

16. A windshield cleaning system comprising a windshield cleaner unit having a wiper and an actuating part reciprocating in a path of movement, a manual control for the cleaner unit, a windshield washer unit operable to deliver a charge of liquid solvent for being spread by the wiper, a coordinator carriage movable from a normal position to a cleaner operating position by and upon operation of the washer unit to utilize the cleaner unit jointly therewith, and a normally inoperative stroke-counting device positionable by the carriage into the path of said actuating part and operable by a predetermined number of strokes thereof to release the carriage from its cleaner operating position, holding means engageable with the carriage to hold it in such cleaner operating position, said stroke-counting device embodying a member movable by the carriage into such path for intermittent engagement by said actuating part to effect step by step advancement of said member, the latter having a release part operable upon a predetermined advancement for rendering said holding means inoperative, and means for returning the carriage to its normal position to arrest the cleaner unit and to displace the member from such path to enable operation of the cleaner unit by the manual control, said carriage being yieldably connected to the manual control to permit such manual operation independently of the washer.

17. A motor vehicle having in combination a windshield washer for projecting washing solvent onto an associated windshield surface, a motor driven windshield wiper for wiping such surface, control means for the wiper manually operable for selectively operating the wiper during long or short periods of time at the option of the driver of the motor vehicle, control means for the washer manually operable for initiating the projection of solvent onto the windshield, and means interlocking the said two control means for automatically initiating the activation of the wiper substantially simultaneously with the initiation of the activation of the washer, said last named means including means for continuing the activation of the wiper for a definite number of wiper cycles of operation over its normal path of operation after its automatic activation and also including means for its deactivation at the end of said definite number of wiper cycles.

18. A windshield cleaning system according to claim 2, wherein a common power means is provided for actuation of said cleaner unit and said washer unit, and said time delay mechanism is activated by said power soucre through the activation of the cleaner unit, and includes a ratchet means for prolonging the activation of said time delay mechanism and said cleaner unit and for deactivating the cleaner unit automatically with the deactivation of the time delay mechanism after such number of wiper strokes.

19. A windshield cleaning system according to claim 2, wherein the time delay mechanism embodies pawl and ratchet means for counting off such number of wiper strokes, and said cleaner unit has an arresting control for operation by said pawl and ratchet means to arrest the cleaner unit.

20. A windshield cleaning system comprising a washer unit including means for spraying a solvent onto an associated windshield for a time interval and then stopping, a wiper unit including a motor and a control therefor, a common control operable to set both units in operation for conjoint operation, and means operable automatically to arrest the two units in a sequential order that prolongs the wiper operation beyond the washer operation, such prolongation of wiper operation depending upon a predetermined number of cycles of wiper operation.

21. A windshield cleaner comprising a wiper system, a washer system, an interconnecting system coupler operable to give conjoint use of both systems with the washer operation being predetermined, a manual control selectively operable to secure an independent actuation of the wiper system, said coupler including a connector normally inoperative to enable such independent actuation but operable to connect both systems for such conjoint use, and a time delay action operable to retard the movement of the connector to its inoperative position for securing wiper operation following the washer operation, said time delay action including arresting means to count off a predetermined number of wiper strokes before arresting said wiper system.

References Cited in the file of this patent

UNITED STATES PATENTS

| | | |
|---|---|---|
| 1,906,047 | Critchfield | Apr. 25, 1933 |
| 2,323,470 | Horton | July 6, 1943 |
| 2,617,136 | Rappl | Nov. 11, 1952 |